US012756602B2

(12) United States Patent
Park et al.

(10) Patent No.: US 12,756,602 B2
(45) Date of Patent: Oct. 6, 2026

(54) INTEGRATED CIRCUIT FOR PERFORMING LINK EQUALIZATION

(71) Applicant: SAMSUNG ELECTRONICS CO., LTD., Suwon-si (KR)

(72) Inventors: Kyu-Min Park, Suwon-si (KR); Byung Jik Kim, Suwon-si (KR); Seung-Woo Lim, Suwon-si (KR); Walter Jun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/626,953

(22) Filed: Apr. 4, 2024

(65) Prior Publication Data

US 2024/0388477 A1 Nov. 21, 2024

(30) Foreign Application Priority Data

May 17, 2023 (KR) ........................ 10-2023-0063613

(51) Int. Cl.
*H04L 1/20* (2006.01)
*H04B 10/077* (2013.01)
*H04L 25/03* (2006.01)

(52) U.S. Cl.
CPC ... *H04L 25/03878* (2013.01); *H04B 10/0775* (2013.01)

(58) Field of Classification Search
CPC ... H04B 1/40; H04B 3/04; H04B 3/46; H04B 1/38; H04B 10/07953; H04B 7/18504; H04B 3/145; H04B 10/25073; H04W 84/12; H04W 12/08; H04W 4/90; H04W 24/02; H04W 28/08; H04W 72/0453; H04W 84/18; H04W 24/08; H04W 4/38; H04L 25/03878; H04L 25/03885;
(Continued)

(56) References Cited

U.S. PATENT DOCUMENTS 9,124,455 B1 9/2015 Lim et al.
9,419,746 B1 * 8/2016 Baeckler ............... H04L 1/0001
9,742,603 B1 8/2017 Bandi et al.
(Continued)

FOREIGN PATENT DOCUMENTS

WO 2017/052665 A1 3/2017

OTHER PUBLICATIONS

European Extended Search Report issued Oct. 9, 2024 by the European Patent Office for EP Patent Application No. 24166366.5.

*Primary Examiner* — Eva Y Puente
(74) *Attorney, Agent, or Firm* — Sughrue Mion, PLLC

(57) ABSTRACT

A method for operating an integrated circuit, including: completing a first link equalization operation with an external integrated circuit; receiving a first signal transmitted by an external transmitter included in the external integrated circuit during an operation at an internal receiver included in the integrated circuit; measuring an eye margin of the first signal at the internal receiver; comparing the measured eye phase with a threshold eye margin to obtain and store a comparison result; transmitting the comparison result as a second signal to an external receiver included in the external integrated circuit using an internal transmitter included in the internal integrated circuit; and performing a second link equalization operation between the external transmitter and the external receiver based on the second signal.

21 Claims, 11 Drawing Sheets

(58) Field of Classification Search
CPC ......... H04L 25/03343; H04L 25/03057; H04L 27/01; H04L 47/125; H04L 25/03019; H04L 1/20
See application file for complete search history.

(56) References Cited

U.S. PATENT DOCUMENTS

| | | | | |
|---|---|---|---|---|
| 9,785,604 | B2 | 10/2017 | Mejia et al. | |
| 10,586,585 | B2 | 3/2020 | Gopalan | |
| 2012/0114023 | A1 | 5/2012 | Mobin et al. | |
| 2014/0269881 | A1* | 9/2014 | He | H04L 25/03878 375/231 |
| 2016/0164703 | A1* | 6/2016 | Stone | H04L 25/03343 398/140 |
| 2019/0042507 | A1* | 2/2019 | Venkatesan | H04L 25/08 |
| 2020/0228375 | A1* | 7/2020 | Chen | H04L 25/0278 |
| 2020/0412586 | A1 | 12/2020 | Mcloughlin | |
| 2021/0349660 | A1 | 11/2021 | Kim et al. | |
| 2022/0200605 | A1 | 6/2022 | Jang et al. | |
| 2023/0069623 | A1 | 3/2023 | Lee et al. | |
| 2024/0104048 | A1* | 3/2024 | Zhang | H04L 1/0001 |

* cited by examiner

FIG. 7

| | pass/fail | tMargin Right (ps) | tMargin Left (ps) | Voltage Margin Low (mV) | Voltage Margin High (mV) | tMargin (ps) | Voltage Margin High (mV) | Margin (tMargin * Height Margin) | Critical Level |
|---|---|---|---|---|---|---|---|---|---|
| Initial | pass | 3 | 3 | 65 | 60 | 6 | 125 | 750 | 1 |
| Runtime #1 | pass | 3 | 3 | 63 | 62 | 6 | 125 | 750 | 1 |
| Runtime #2 | pass | 2 | 2 | 58 | 60 | 4 | 118 | 472 | 4 |
| Runtime #3 | fail | 2 | 1 | 40 | 60 | 3 | 100 | 300 | 8 |
| ... | ... | ... | ... | ... | ... | ... | ... | ... | ... |
| Runtime #n | fail | 2 | 1 | 35 | 60 | 3 | 95 | 285 | 9 |

FIG. 8

| Bits | Description |
|---|---|
| 31:24 | Reserved |
| 23:16 | Log Page Identifier: |
| 15:08 | Asynchronous Event Information: |
| 07:03 | Reserved |
| 02:00 | Asynchronous Event Type: Indicates the type of the asynchronous event. More specific information on the event is provided in the Asynchronous Event Information field. |

| Value | Description |
|---|---|
| 000b | Error status |
| 001b | SMART/Health status |
| 010b | Notice |
| 011b to 101b | Reserved |
| 110b | I/O Command Set specific status |
| 111b | Vendor specific |

FIG. 9

| Log Identifier | Scope | Log Page Name |
|---|---|---|
| C0h to FFh | Vendor specific [5] | |

FIG. 10

| Bytes | Description |
|---|---|
| 0 | pass/fail |
| 1 | critical level |
| 2 | tMargin Right (ps) |
| 3 | tMargin Left (ps) |
| 4:5 | Voltage Margin Low (mV) |
| 6:7 | Voltage Marin High (mV) |
| 8 | tMargin (ps) |
| 9:10 | Height Margin (mV) |
| 11:12 | Margin (tMargin * Height Margin) |
| 13:63 | reserved |

FIG. 12

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | Offset |
|---|---|---|---|---|---|---|---|---|---|---|---|---|---|---|---|---|---|---|---|---|---|---|---|---|---|---|---|---|---|---|---|---|
| Voltage Margin High | | | | | | | | | Voltage Margin Low | | | | | | | | | tMargin(L) | | | | tMargin (R) | | | | critical level | | | | | R | +008h |
| | | | | | | | Margin | | | | | | | | | | Voltage Margin | | | | | | | | | | tMargin | | | | | +00Ch |
| | | | | | | | | | | | | | | | | | | | | | | | | | | | | | | | | +010h |

INTEGRATED CIRCUIT FOR PERFORMING LINK EQUALIZATION

CROSS-REFERENCE TO RELATED APPLICATION

This application is based on and claims priority under 35 U.S.C. § 119 to Korean Patent Application No. 10-2023-0063613, filed on May 17, 2023 in the Korean Intellectual Property Office, the disclosure of which is incorporated by reference herein in its entirety.

BACKGROUND

1. Field

The disclosure relates to an interface between integrated circuits, and more particularly to performing link equalization.

2. Description of Related Art

In a communication operation performed using a link between integrated circuits included in an electronic system or a communication operation performed using a link inside the integrated circuit, communication performance may be limited by a bandwidth of a channel. As an example, signals transmitted through high-performance links between integrated circuits may be degraded by many influences, such as attenuation which reduces a pulse-response size of the signals, dispersion which widens a pulse-response width of the signals, and reflection which causes a ripple after the pulse response. Because the extent of the influences may vary depending on operating environments of an electronic system (e.g., Process, Voltage, and Temperature (PVT) conditions), the electronic system may perform a link equalization operation such that optimum communication is enabled in consideration of the operating environment.

SUMMARY

Provided an integrated circuit in which an operating performance is improved by performing a link equalization operation in real time when a change occurs in channel features of a link between integrated circuits during operation.

Additional aspects will be set forth in part in the description which follows and, in part, will be apparent from the description, or may be learned by practice of the presented embodiments.

In accordance with an aspect of the disclosure, a method for operating an integrated circuit includes: completing a first link equalization operation with an external integrated circuit; receiving a first signal transmitted by an external transmitter included in the external integrated circuit during an operation at an internal receiver included in the integrated circuit; measuring an eye margin of the first signal at the internal receiver; comparing the measured eye phase with a threshold eye margin to obtain and store a comparison result; transmitting the comparison result as a second signal to an external receiver included in the external integrated circuit using an internal transmitter included in the internal integrated circuit; and performing a second link equalization operation between the external transmitter and the external receiver based on the second signal.

In accordance with an aspect of the disclosure, an integrated circuit includes a first receiver configured to receive a first signal from an external integrated circuit after an initial link equalization is completed; a reception equalizer configured to compensate for signal distortion of the first signal to generate a second signal; an eye margin check module configured to: measure an eye margin of the second signal, compare the measured eye margin with a threshold eye margin to obtain a comparison result, and store the comparison result; and a first transmitter configured to: transmit the comparison result to the external integrated circuit as an asynchronous event request (AER), and based on receiving a register read command corresponding to the AER from a second transmitter of the external integrated circuit, transmit the stored comparison result to a second receiver of the external integrated circuit and perform a link re-equalization operation with the external integrated circuit.

In accordance with an aspect of the disclosure, a storage device includes: at least one processor configured to: perform an initial link equalization with a host; measure an eye margin of a signal received from the host during an operation with the host; store the measured eye margin and a comparison result determined based on a comparison between the measured eye margin and a threshold eye margin; transmit the comparison result to the host; and perform a link re-equalization with the host based on the comparison result.

However, aspects of the present invention are not restricted to those set forth herein. The above and other aspects of the present disclosure will become more apparent to one of ordinary skill in the art to which the present invention pertains by referencing the detailed description provided below.

BRIEF DESCRIPTION OF DRAWINGS

The above and other aspects, features, and advantages of certain embodiments of the present disclosure will be more apparent from the following description taken in conjunction with the accompanying drawings, in which:

FIG. 7 is a table for explaining an information module 320, according to an embodiment.

FIG. 8 is a table for explaining equalization information (that is transmitted to the host by the storage device, according to an embodiment.

FIG. 9 is a table for explaining the command for reading the equalization information by the host, according to an embodiment.

FIG. 10 is a table for explaining the equalization information that is read by the command of FIG. 9, according to an embodiment.

FIGS. 11 and 12 are tables for explaining the format of equalization information that is read into the command of FIG. 9, according to an embodiment.

DETAILED DESCRIPTION OF EMBODIMENTS

Figure 1:
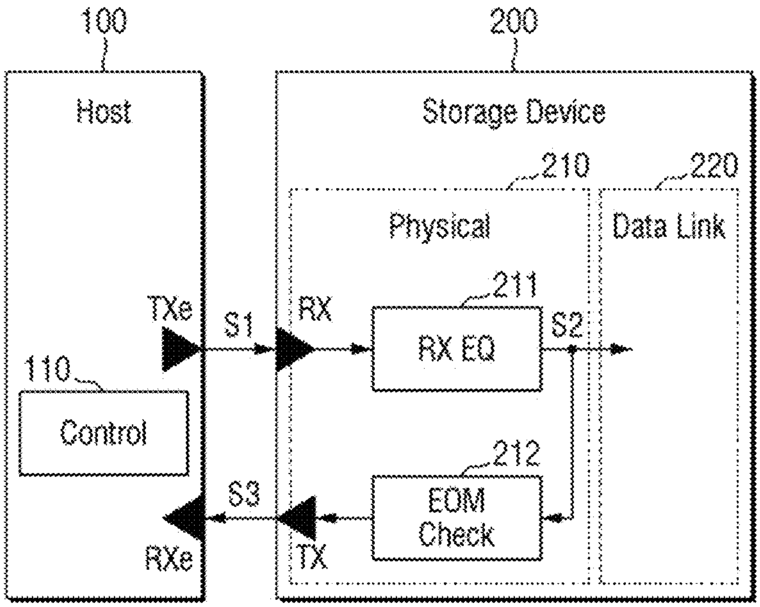
FIG. 1 is a block diagram showing the electronic system, according to an embodiment.

An electronic system according to some embodiments of the present invention is described below reference to FIGS. 1 to 14.

As is traditional in the field, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

Figure 2:
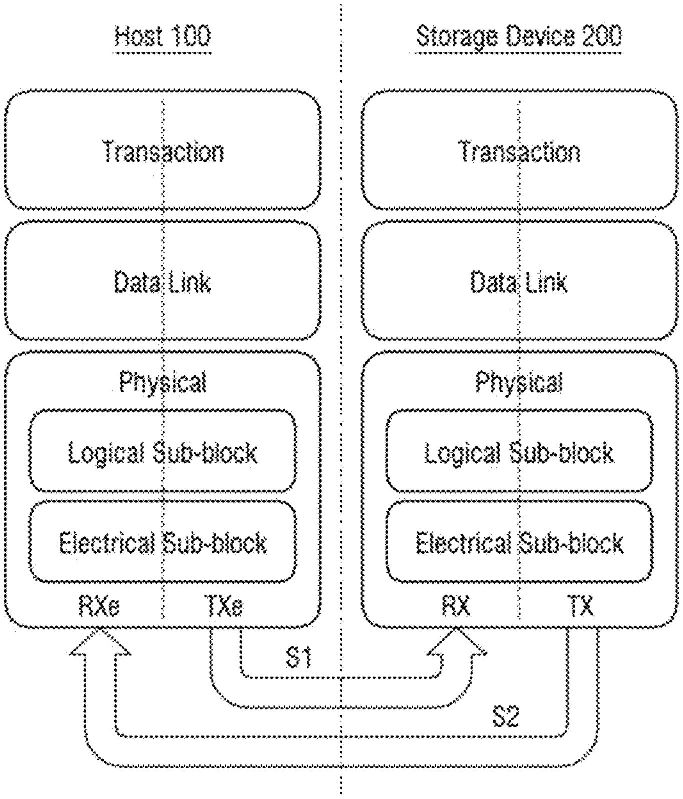
FIG. 2 is a conceptual diagram for explaining a network layer of an inter-integrated circuit link of the electronic system of FIG. 1, according to an embodiment.

FIG. 1 is a block diagram showing the electronic system according to some embodiments, and FIG. 2 is a conceptual diagram for explaining a network layer of an inter-integrated circuit link of the electronic system of FIG. 1.

Referring to FIG. 1, the electronic system may include a plurality of integrated circuits. According to some embodiments, the electronic system may include a first integrated circuit and a second integrated circuit. As an example, the first integrated circuit of the electronic system may be a host 100, and the second integrated circuit may be a memory system such as a storage device 200. Although embodiments are described herein with respect to a memory system including the host 100 and the storage device 200, the description may also be applied to any first integrated circuit and second integrated circuit. For example, description of the host 100 provided herein may be applied to a first integrated circuit, and description of the storage device 200 provided herein may be applied to a second integrated circuit The host 100 and the storage device 200 may include a transmitter and a receiver, respectively. The transmitters and receivers may be connected by a link which may include multiple lanes. For example, a transmitter TXe of the host 100 and the receiver RX of the storage device 200 may be connected by a first link (which may be referred to as a first channel), and the transmitter TX of the storage device 200 and the receiver RXe of the host 100 may be connected by a second link (which may be referred to as a second channel). The first link and the second link may operate independently of each other as separate paths. In description herein, names such as first and second are intended only for distinguishing different components, and the scope of the disclosure is not limited to the names.

According to some embodiments, an interface between the host 100 and the storage device 200 may be connected by a PCI Express (PCIe) interface (for example PCI Express® 6.0 Specification, the contents of which are incorporated by reference herein in its entirety). The PCIe interface may include a plurality of layers. Referring to FIG. 2, the PCIe interface may include a physical layer, a data link layer, and a transaction layer.

As shown in FIG. 2, the physical layer may include an electrical sub-block and a logical sub-block. The electrical sub-block may act as a transfer mechanism for transmitting and receiving signals between the host 100 and the storage device 200, and may include a transmission buffer and a reception buffer at each transmitter and receiver. The electrical sub-block may convert an electrical signal and transmit it from the host 100 to the storage device 200, or from the storage device 200 to the host 100, through the link. The logical sub-block of the transmitter may convert the data to be transmitted from the data link layer into the form of a packet. For example, operations such as data scrambling, bit encoding, and packet framing may be performed. The logical sub-block of the receiver may perform operations such as deframing, decoding, and descrambling on the received electrical signal.

The data link layer may be located between the physical layer and the transaction layer, and may act as a gate keeper for each individual link to maintain the integrity of data packets. The data transmitted and received through the link may be correct and received in the same order as the transmitted order. Detailed contents of the physical layer, data link layer, and transaction layer may correspond to, for example, PCIe version 3.0.

The transmitter TXe and the receiver RXe of the host 100 and the transmitter TX and the receiver RX of the storage device 200 may be included in the physical layer, and a link equalization may be performed for signal integrity between the transmitter TXe and the receiver RX, or between the transmitter TX and the receiver RXe.

The link equalization process may be used to optimize a high-speed interface environment after PCIe version 3.0, and may the transmission signal from the transmitter TXe of the host 100 to the receiver RX of the storage device 200, or from the transmitter TX of the storage device 200 to the receiver RXe of the host 100.

For example, one or more of the transmitters TXe and TX and the receivers RXe and RX may perform an initial link equalization operation when either the host 100 or the storage device 200 is powered up. The initial equalizing operation may include measuring a figure of merit (FOM) value of an initial eye pattern on the basis of an S1 signal transmitted from the host 100 to the storage device 200, and storing the measured FOM value of the initial eye pattern in the storage device 200. The FOM value may include a center position, an upper value, a lower value, a left value, and a right value of the eye pattern according to some embodiments.

The storage device 200 may transmit and receive signals to and from the host 100 depending on the interface environment that is set by the initial link equalization operation. When the host 100 and the storage device 200 continuously transmit and receive the signal to operate, an event that affects the operating temperature, voltage, and current inside the storage device 200 may occur depending on the operating environment. For example, due to factors such as heat generation or vibration of the storage device 200, the signal integrity in the first link and the second link may deteriorate.

The storage device 200 may continuously measure the eye pattern of the S1 signal received at the host 100, even after the initial link equalization, to determine the signal integrity at the physical layer, and may request the host 100 for the link equalization operation to be performed again to reset the interfacing environment when a threshold eye margin is exceeded. The threshold eye margin may be determined by a shift range of the center position and shift ranges of each of the upper, lower, left, and right directions on the basis of the FOM value of the initial eye pattern.

The host 100 may include a control module 110. According to some embodiments, the control module 110 may transmit the S1 signal to the storage device 200 through a transmitter TXe, and receive the S3 signal from the storage device 200 through a receiver RXe. Each of the transmitter TXe and the receiver RXe of the host 100 may be connected to the receiver RX and the transmitter TX of the storage device 200 through the first link and the second link, by mutually independent paths. The control module 110 may control the link equalization operation for the first link between the transmitter TXe of the host 100 and the receiver RX of the storage device 200. The control module 110 may also control the link equalization operation for the second link between the receiver RXe of the host 100 and the transmitter TX of the storage device 200. According to some embodiments, the link equalization operations for the first link and the second link may be set to the same environment on the basis of the S1 signal or the S3 signal, or the first link and the second link may be set in different environments.

The interface of the storage device 200 may include a physical layer 210 and a data link layer 220, and the storage device 200 may include a transmitter TX, a receiver RX, a reception equalizer 211 (illustrated as "RX EQ"), and an eye margin check module 212 (illustrated as "EOM Check") at the physical layer 210.

The storage device 200 may receive an S1 signal from the host 100 through the receiver RX and transmit the S3 signal to the host 100 via the transmitter (TX, 200).

The control module 110 may include a link equalization request in the S1 signal, and transmits it to the storage device 200 through the first link. The reception equalizer 211 may perform configuration of at least one of the first link and the second link on the basis of the link equalization request of the host 100. The reception equalizer 211 may compensate for signal distortion or the like included in the S1 signal in the transmission process of the initial link to generate the S2 signal. The physical layer 210 may process the S2 signal in the logical sub-block and transmit it to the data link layer 220.

The eye margin check module 212 may measure the eye margin of the S1 signal received at the receiver RX during the link equalization operation, and determine whether there is an abnormality in the measured eye margin before logging. The eye margin check module 212 may compare the threshold eye margin with the measured eye margin, calculate how much the eye phase has shifted as a comparison result, include the comparison result in the S3 signal, and transmit it to the receiver RXe of the host 100 through the transmitter TX.

As an example, the threshold eye margin may be a margin in which the shift range is defined on the basis of the initial eye pattern of the S1 signal measured at the receiver RX at the time of the initial link equalization operation of the host 100 and the storage device 200 according to some embodiments. As another example, the threshold eye margin may be a margin in which the shift range is defined on the basis of the eye pattern re-measured and updated by the link re-equalization operation according to some embodiments. The eye margin may be measured as a center position, a horizontal margin, and a vertical margin of the eye according to some embodiments. For example, in the eye margin, a timing margin (left and right, [%] units) may be measured as the horizontal margin, and a voltage margin (upper and lower, [mV] units) may be measured as the vertical margin.

When the S3 signal is received through the receiver RXe, the host 100 may determine to perform the link equalization operation, and may transmit the S1 signal including the link re-equalization command to the receiver RX of the storage device 200. When the S1 signal is received again, the storage device 200 may reestablish the interfacing environment according to the link re-equalization command of the host 100. The eye margin check module 212 of the storage device 200 mays tore the re-measured eye margin on the basis of the re-received S1 signal, and may update the threshold eye margin on the basis of the re-measured eye pattern.

Figure 3:
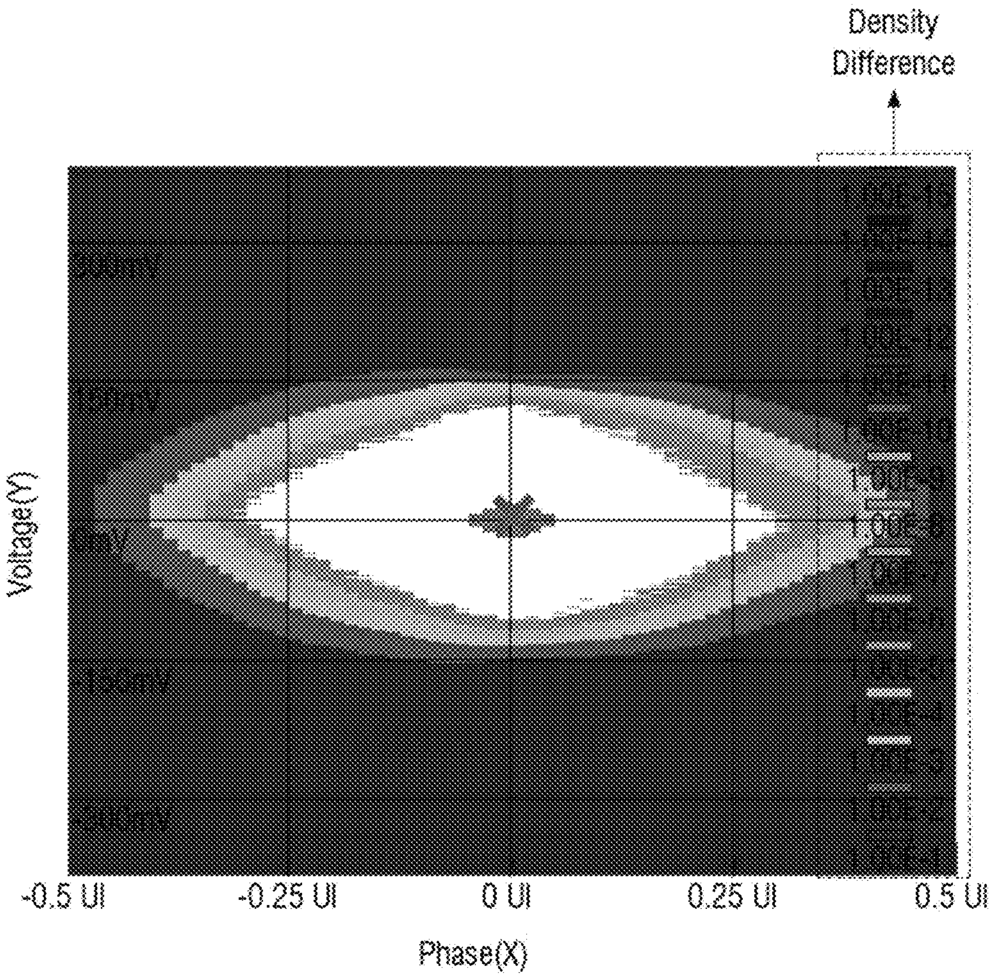
FIG. 3 is an eye pattern diagram showing an initial eye margin measured at the receiver of the storage device, according to an embodiment.
Figure 4:
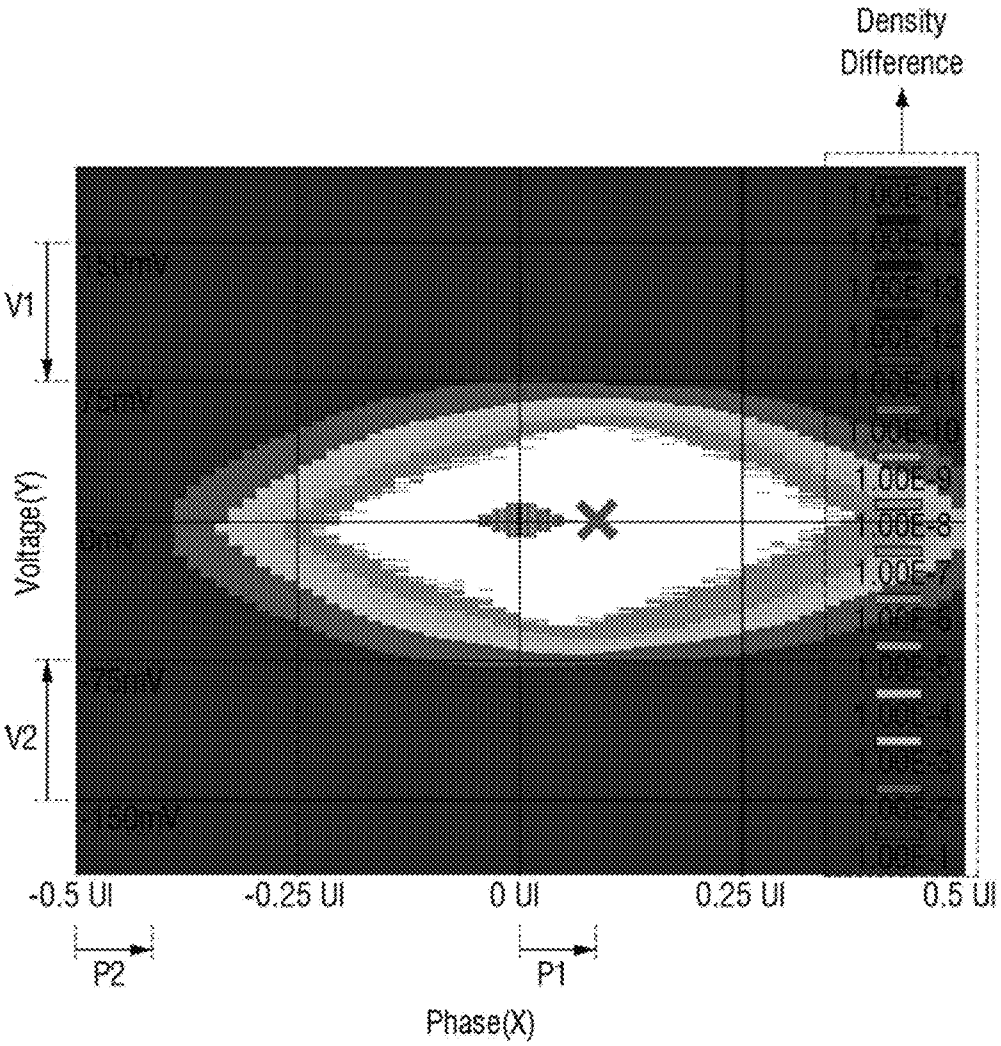
FIG. 4 shows an eye margin re-measured at the receiver during operation of the storage device, according to an embodiment.

FIG. 3 is an eye pattern diagram showing an initial eye margin measured at the receiver of the storage device, and FIG. 4 shows an eye margin re-measured at the receiver during operation of the storage device. In the eye pattern diagram, a first axis X may represent a phase, a second axis Y may represent a voltage (Vref), and a density difference of the diagram shown by the eye pattern may represent BER (Bit Error Rate).

Referring to FIG. 3, the initial eye margin measured at the time of the initial link equalization operation after turning on the power supply of the host storage device may be represented as a shape similar to the form of a human eye, e.g., a horizontally elongated ellipse. In the illustrated example, when the initial eye margin is explained on the basis of an internal white area, the center position may be [0 UI, 0 mV], the width (horizontal length or first axis length) may be located between Phase −0.3 UI to 0.3 UI, and the height (vertical length or second axis length) may be indicated between −150 mV and 150 mV.

However, the eye margin of the storage device 200 may be deformed due to various factors during operation, for example the occurrence of an event, vibration, and the like that may affect the operating temperature, voltage, and current.

For example, referring to FIG. 4, the position of the eye margin re-measured during operation may be shifted in comparison with the initial eye margin. The center position (illustrated as an X) of the re-measured eye margin may be [0.1 UI, 0 mV], the width may be located between Phase −0.25 UI and 0.37 UI, and the height may be indicated between −75 mV and 75 mV. When comparing the re-measured eye margin with the initial eye margin, the center position may be shifted by P1, a left edge in the horizontal direction may be shifted by P2, and the horizontal length may be similar. However, the margin may be decreased by V1 (150 mV→75 mV) and by V2 (150 mV→75 mV) and shifted in the vertical direction.

Therefore, the center position may be shifted by 0.1 UI in a right direction, the width (horizontal length) may be similar, the vertical length may be halved, and the re-measured eye margin in comparison to the initial eye margin is may be displayed by being deformed to a distorted elliptical pattern or in the form of a distorted rhombus.

If the interfacing environment between the host 100 and the storage device 200 continues to be maintained in a deformed eye margin, the signal between the host and the storage device may be distorted, which may cause difficulties in maintaining the signal integrity. Therefore, if the level of the received signal is measured at any time during the operation of the storage device, and the result measured through link re-equalization is reflected in the interfacing environment of the link between the host and the storage device, the signal integrity may be maintained without rebooting.

Figure 5:
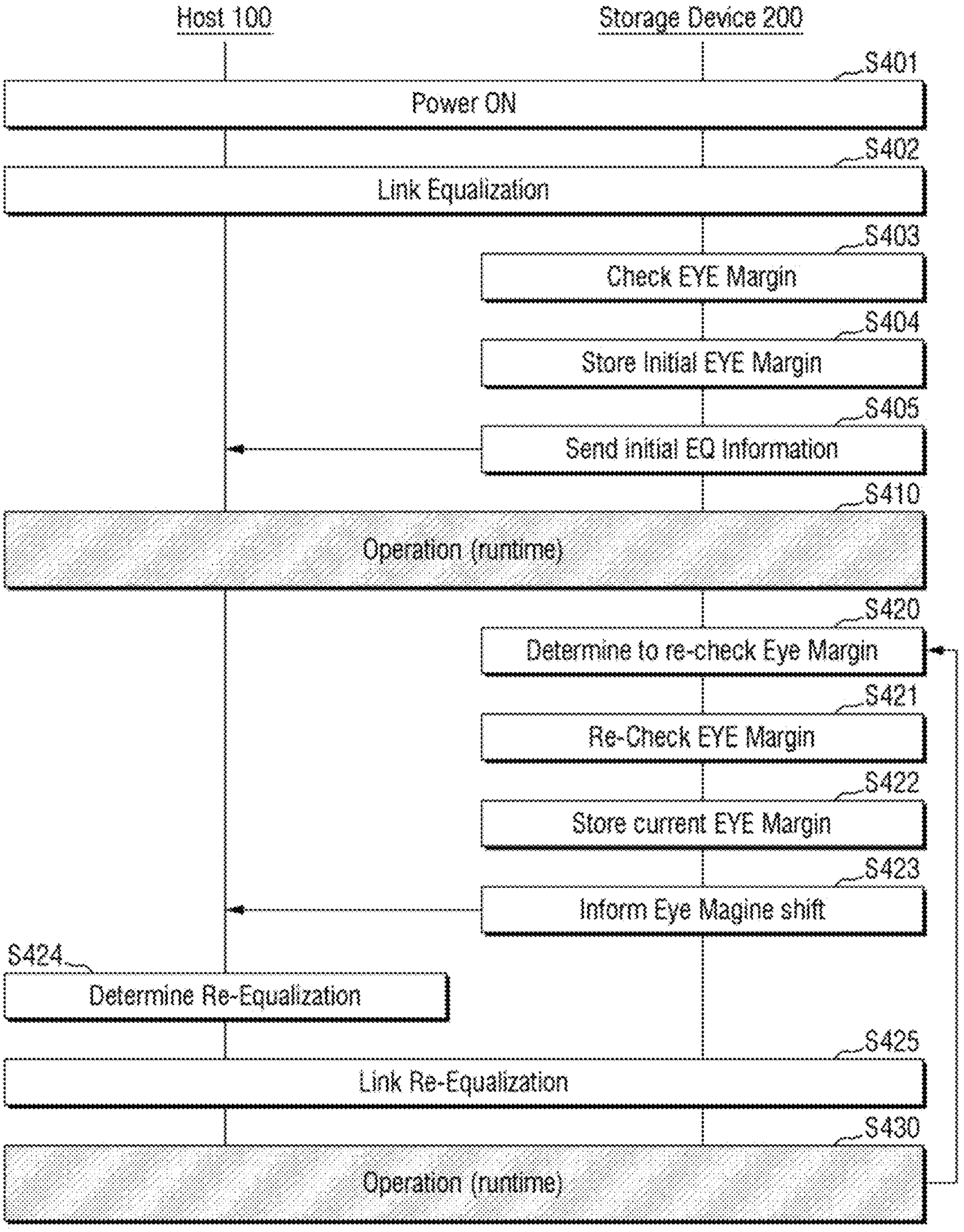
FIG. 5 is a flow chart showing a method of operating a memory system, according to an embodiment.

FIG. 5 is a flow chart showing a method of operating a memory system according to some embodiments.

Referring to FIG. 5, when the memory system is powered up or powered on at operation S401, the host 100 and storage device 200 may continue to perform the initial link equalization at operation S402). For example, the host 100 may transmit an initial S1 signal including a link equalization command to the storage device 200, and the storage device 200 establishes an interfacing environment with the host 100 in response to the initial S1 signal.

The storage device 200 may measure the initial eye margin on the basis of the eye pattern of the initial S1 signal at operation S403), and store the FOM value of the initial eye margin at operation S404. The initial eye margin may be stored in the form of a table according to some embodiments. The equalization (EQ) information based on the initial eye margin may be included in the S3 signal and transmitted to the host 100 at operation S405). The FOM value and equalization information will be described below in detail in FIGS. 8 to 12. The storage device 200 establishes the interfacing environment on the basis of the initial eye margin.

The host 100 and the storage device 200 perform operations (for example, memory access operations) at operation S410 under the interfacing environment that is established in S403 to S405. When the storage device 200 encounters a state in which it is necessary or desirable to re-measure the eye margin during operation at operation S420, the storage device 200 may re-measure the eye margin at operation S421.

According to embodiments, the storage device 200 may determine to re-measure the eye margin at operation S420. In some embodiments, the re-measurement may be performed for each preset or predetermined cycle according to some embodiments. In some embodiments, the eye margin may be re-measured each time the performance of the operation of the storage device 200 exceeds a preset time or count.

In some embodiments, the eye margin may be re-measured each time at least one threshold aging feature value among aging feature values of the storage device is exceeded. The aging feature value may include, for example, a total amount of data stored in the storage device, the degree of deterioration of memory cells included in the storage device, and the like. Because the eye phase may change may depend on the extent of the lifetime of the storage device 200, a plurality of threshold aging feature values may be set, and when at least one aging feature value exceeds the set threshold aging feature value, the eye margin may be re-measured.

In some embodiments, the eye margin may be re-measured when the internal operating temperature of the storage device 200 exceeds a preset threshold temperature for a period of time, according to some embodiments.

When the storage device 200 enters the state to be re-measured in S420, the storage device 200 may re-measure the eye margin at operation S421. The storage device 200 may store the FOM value of the re-measured eye margin at operation S422. The FOM value may be stored in form of table following the initial eye margin stored at operation S404. According to some embodiments, the FOM values of the initial eye margin and re-measured eye margin may be stored in a ring buffer in the form of a table.

The storage device 200 may compare the threshold eye margin with the re-measured eye margin and store the comparison result at operation S422. The threshold eye margin may include the upper value, lower value, left value, right value, and center position of the initial eye margin measured at the initial link equalization and the shift range from each.

According to an embodiment, the comparison result may include the shift value of the re-measured eye margin in comparison with the threshold eye margin, and according to another embodiment, the comparison result may be stored by reflecting the weighted value for each preset type in the shift value of the re-measured eye margin in comparison with the threshold eye margin. The weighted value for each type may be a weighted value which considers the degree of importance of factors that affect the channel reliability between the host 100 and the storage device 200 among modified forms of the eye margin.

The storage device 200 may transmit the comparison result to the host 100 at operation S423. According to some embodiments, the storage device 200 may store the comparison result in the ring buffer, and then may transmit the comparison result to the host, when the shift value of the re-measured eye margin exceeds the threshold eye margin. According to some embodiments, the storage device 200 may store the comparison result in the ring buffer, and then may transmit the comparison result to the host, when a value obtained by reflecting the weighted value in the shift value of the re-measured eye margin exceeds the threshold eye margin. According to some embodiments, the storage device 200 may store the comparison results in the ring buffer, and then may transmit the comparison result to the host when there is a request of the host 100. The comparison result may be included in the EQ information and transmitted.

The equalization information may include the presence or absence of deformation of the measured eye margin, on the basis of comparison results according to some embodiments. According to some embodiments, the equalization information may further include the shift value of measured eye margin, on the basis of the comparison result. According to some embodiments, the equalization information may further include retraining information based on the shift values on the basis of the comparison results. The retraining information may relate to, for example, a critical grade that is set for each range to which the shift value belongs.

The host 100 determines whether to perform the link re-equalization according to the received equalization information at operation S424. If the shift value is determined to exceed the threshold shift level according to some embodiments, the host 100 may perform the link re-equalization with the storage device 200 at operation S425. According to some embodiments, the host 100 may determine whether to perform the link re-equalization with the storage device 200 depending on the critical grade included in the retraining information.

The host 100 may reset the signal level of the transmission signal S1 to be transmitted to the receiver RX of the storage device 200 on the basis of the equalization information. For example, the host 100 may transmit a reset S1 signal to the storage device 200, and the storage device 200 may measure the eye margin of the reset S1 signal and compare the measured eye margin with the threshold eye margin. If the shift value as the comparison result does not exceed the threshold shift level as a result of comparison, then the host 100 and the storage device 200 may operate while maintaining the initial link at the reset signal level at operation S430.

The storage device 200 may operate even after the link re-equalization at operation S430, re-measure the eye margin in real time at operation S420), and repeat operations S421 to S425 for the re-measured eye margin.

Figure 6:
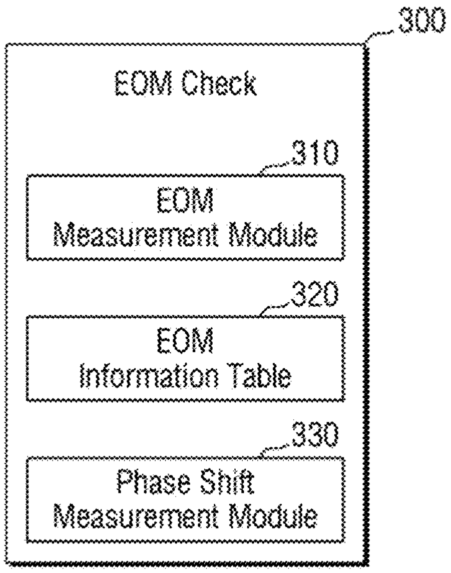
FIG. 6 is a diagram that specifically shows an eye margin check module. according to an embodiment.

FIG. 6 is a diagram that shows an eye margin check module according to some embodiments. FIG. 7 is a table for explaining an information module 320 according to some embodiments.

According to some embodiments, the eye margin check module 212 of FIG. 1 may correspond to the eye margin check module 300 of FIG. 6. For example, the eye margin check module 300 may include a measurement module 310 (illustrated as "EOM Measurement Module"), an information module 320 (illustrated as "EOM Information Module"), and a shift measurement module 330 (illustrated as "Shift Measurement Module").

The measurement module 310 may measure the eye margin of the S1 signal received from the host 100. The FOM values including the center position, and the upper, lower, left and right values on the basis of the center position, may be extracted from the eye margin of the S1 signal of the measurement module 310. For example, as described with respect to FIGS. 3 and 4, the FOM values including the center position of the eye margin, and the upper, lower, left, and right values measured on the basis of boundary with the center position of the eye margin, may be extracted. The FOM values will be explained in the example shown in FIG. 8. The upper value, lower value and vertical length may be measured as Voltage Margin High, Voltage Margin Low, and Height Margin, respectively, and the left and right values and horizontal length may be measured as tMargin Left, tMargin Right, and tMargin, respectively.

According to some embodiments, the measurement module 310 may periodically measure the eye margin of the S1 signal each time a preset time or a preset count elapses according to some embodiments. According to some embodiments, the measurement module 310 may measure the eye margin in response to the request from the host 100 according to some embodiments. According to some embodiments, the measurement module 310 may measure the eye margin when the operating temperature of the storage device 200 exceeds the threshold temperature for a period of time according to some embodiments. According to some embodiments, the measurement module 310 may measure the eye margin each time at least one of the aging feature values of the storage device 200 exceeds the threshold aging feature value according to some embodiments.

The information module 320 may be implemented as, or may include, a ring buffer in which a plurality of buffers may be connected in the form of a ring according to some embodiments, and may sequentially store the measured values and the like according to the operating time. For example, the information module 320 may store the values measured by the measurement module 310 at each operating time (illustrated as "Runtime #" in FIG. 7) as register values in the form of a table.

According to some embodiments, the information module 320 may store the measured values each time the eye margin is measured by the measurement module 310. According to some embodiments, the information module 320 may store the measured values only when the eye margin measured by the measurement module 310 exceeds the threshold eye margin. According to some embodiments, the information module 320 may store the measured values by reflecting the weighted value for each type in shift values of the upper value, lower value, left value, and right value as a result of comparing the eye margin measured by the measurement module 310 with the threshold eye margin. The weighted value for each type may be a weighted value that is preset to detect factors that affect the data reliability or signal integrity of the storage device 200, even if the threshold eye margin is not exceeded, by predicting and learning the eye margin that changes depending on the operating features of the storage device 200 in advance. In some embodiments, this prediction and learning may be performed by or using a machine learning or artificial intelligence model, but embodiments are not limited thereto.

The shift measurement module 330 may calculate a comparison result obtained by comparing the measured eye margin with the threshold eye margin. For example, the shift measurement module 330 may calculate a shift critical grade and a deformation presence/absence determination flag as the comparison result. In some embodiments, the deformation presence/absence determination may indicate whether deformation is determined to be present or absent, or may for example indicate whether measured eye margin passes or fails with respect to the threshold eye margin, or whether the deformation passes or fails with respect to a threshold deformation level. The critical grade may be used to determine the degree of shift of the measured eye margin in comparison with the threshold eye margin, and the level value may be mapped to for each range to which an area value calculated on the basis of the measured values (e.g., Voltage Margin High, Voltage Margin Low, Height Margin, tMargin Left, tMargin Right, and tMargin) to which the area value belongs. The threshold eye margin may be based on the initial eye margin at the time of the initial link-equalization. If the link re-equalization is performed later, the threshold eye margin based on the last eye margin measured at the receiver RX of the storage device 200 before link re-equalization. For example, the last eye margin may refer to the eye margin which is measured last from among a plurality of eye margins measured before link re-equalization.

If the storage device 200 itself exceeds the threshold level value on the basis of the level value of the critical grade, the degree of deformation may be determined to be severe, and the deformation presence/absence determination flag of the measured eye margin may be set to indicate "present" and/or "fail". If the eye margin is below the threshold level value, the degree of deformation may be determined to be normal, and the deformation presence/absence determination flag may be set to indicate "absent" and/or "pass". For example, the deformation presence/absence determination flag may be represented by one or more bits having at least two states, and at least one of the states may be used to indicate "present" and/or "fail", and at least one other of the states may be used to indicate "absent" and/or "pass". The critical grade may be an index that indicates the degree of shift on the basis of the threshold eye margin.

In the example shown in FIG. 7, when the critical grade is 1 to 10, the level value of the critical grade with respect to the threshold eye margin may be 1. In the shown example, the initial eye margin may be set to the threshold eye margin and the critical grade of the initial eye margin may be indicated as 1. When the threshold level value of the critical grade is set to be 6, if the threshold level exceeds 6, the deformation presence/absence determination flag may be set to indicate "fail", and if the threshold level is less than 6, the deformation presence/absence determination flag may be set to indicate "pass". However, the descriptions of the critical grade, level value, and deformation presence/absence determination flag are only examples for understanding, and the embodiments are not limited to the above numerical values or names.

The information module 320 may further include and store the measured values (Voltage Margin High, Voltage Margin Low, Height Margin, tMargin Left, tMargin Right, tMargin), the area value Margin (which may be equal to tMargin*Height Margin) calculated from the shift measurement module 330 according to some embodiments, the critical grade corresponding to each area value, and the deformation presence/absence determination flag of the eye margin measured according to the critical grade.

Figure 11:
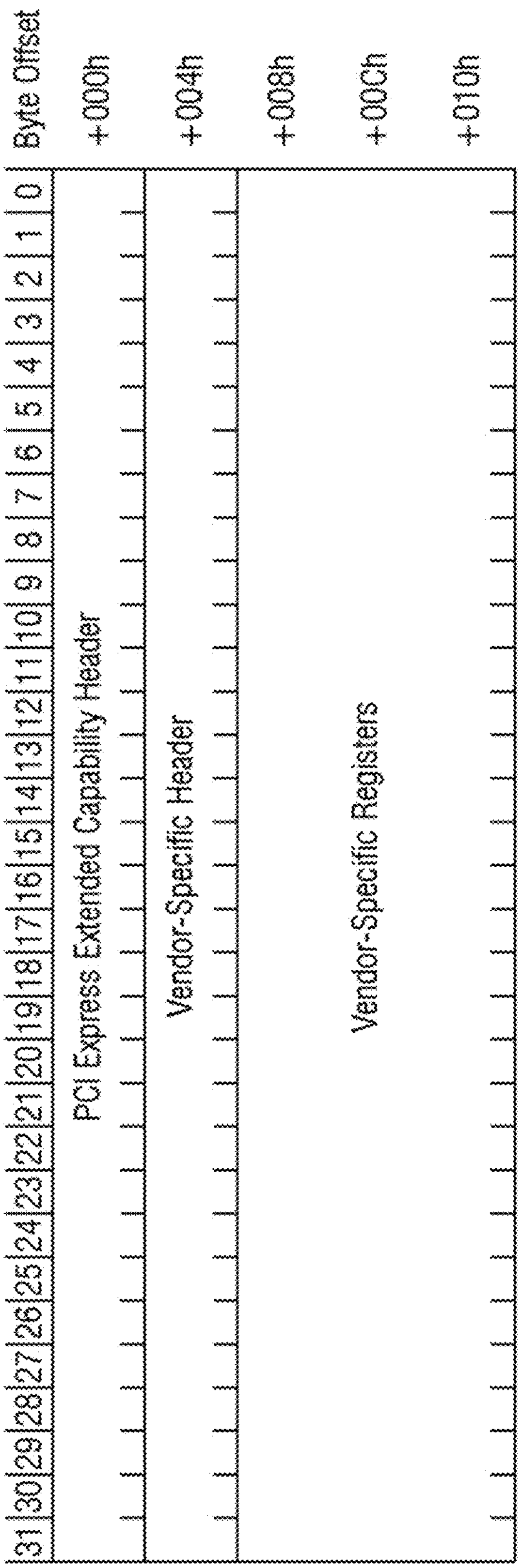

FIG. 8 is a table for explaining an example of EQ information that is transmitted to the host 100 by the storage device 200 according to some embodiments. FIG. 9 is a table for explaining an example of a command for reading the equalization information by the host according to some embodiments. FIG. 10 is a table for explaining an example of EQ information that is read by the command of FIG. 9 according to some embodiments. FIGS. 11 and 12 are tables for explaining an example of the format of EQ information that is read into the command of FIG. 9 according to some embodiments.

Referring to FIG. 8, the storage device 200 may transmit the EQ information to the host 100 during operation (e.g., operation S423 of FIG. 6) according to some embodiments. For example, the presence of EQ information may be included in asynchronous event request (e.g., an asynchronous event request command) of a non-volatile memory express (NVMe) Specification (for example NVM Express® Revision 2.0, the disclosure of which is incorporated by reference herein in its entirety), and may be transmitted to the host.

The asynchronous event request may include 32 bits according to the NVMe Specification, and the storage device 200 may transmit Vendor Specific Information (e.g. a value of "111b") to the host 100 in [02:00] bits in the asynchronous event request to notify presence of EQ information.

Referring to FIG. 9, when the host 100 receives an asynchronous event request including the value "111b", the host 100 may transmit a register read command such as Get Log Page to the storage device 200. For example, the Get Log Page command causes the host to read a registry that stores vendor information in the storage device in response to the asynchronous event request including the value "111b". For example, the Get Log Page command may cause the host to read the information module 320 in response to the asynchronous event request including a value of "111b".

For example, the Get Log Page command may include an equalizing information read request defined by log identifiers having values of "C0h" to "FFh" to read the equalizing information among vendor information.

Referring to FIG. 10, the equalizing information for each operating time stored in the information module 320 and transmitted according to the Get Log Page command of the host 100 may be stored in the form of log data. The log data may include calculated values according to the measured values and comparison results. For example, assuming that the equalizing information is 64 bytes, the log data may include a deformation presence/absence determination flag (pass/fail) of the measured eye margin, level value of critical grade, measured values (e.g., tMargin Right, tMargin Left, Voltage Margin Low, Voltage Margin High, tMargin, Height Margin), and area values (e.g., Margin=(tMargin*Height Margin)) within 0 to 12 bytes.

When the Get Log Page command including log identifiers having values of "C0h" to "FFh" are received from the host 100, the storage device 200 may read the log data stored in the information module 320, for example the equalizing information shown in FIG. 11.

Referring to FIG. 11, the storage device 200 may transmit the read equalizing information to a vender information register value (e.g., Vendor Specific Register) defined in the PCIe specification. The vendor information register value of FIG. 11 may include equalizing information as shown in FIG. 12.

Log data defined as in FIG. 10 is transmitted from the storage device 200 to the host 100 by including the equalization information as in FIGS. 11 and 12.

The host may receive the log data and perform the link re-equalization based on the log data.

Figure 13:
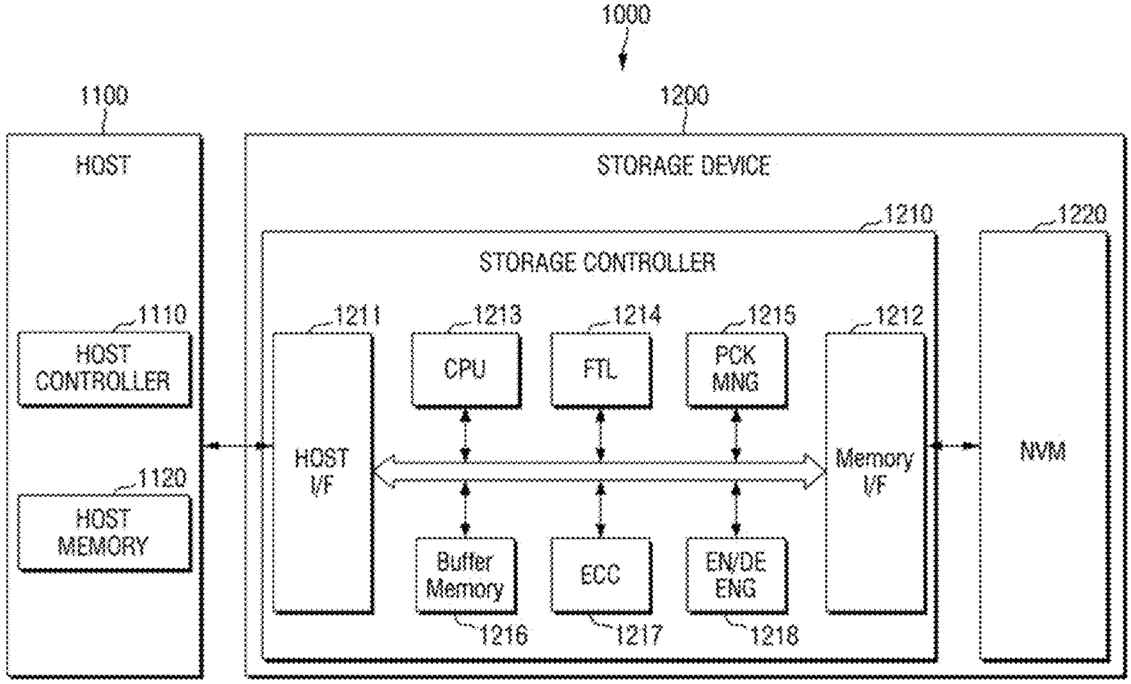
FIG. 13 is a block diagram showing a host-storage system, according to an embodiment.

FIG. 13 is a block diagram showing a host-storage system 1000 according to an exemplary embodiment of the invention.

The host-storage system 1000 may include a host 1100 and a storage device 1200. The storage device 1200 may include a storage controller 1210 and a non-volatile memory (NVM) 1220. Further, according to exemplary embodiment of the present invention, the host 1100 may include a host controller 1110 and a host memory 1120. The host memory 1120 may function as a buffer memory for temporarily storing data to be transmitted to the storage device 1200 or data transmitted from the storage device 1200.

The storage device 1200 may include storage medium for storing data in response to a request from the host 1100. As an example, the storage device 1200 may include at least one of an SSD (Solid status Drive), an embedded memory, and a detachable external memory. When the storage device 1200 is the SSD, the storage device 1200 may be, for example, a device that complies with a non-volatility memory express (NVMe) standard. When the storage device 1200 is an embedded memory or an external memory, the storage device 1200 may be a device that complies with a UFS (universal flash storage) or an eMMC (embedded multi-media card) standard. The host 1100 and the storage device 1200 may each generate and transmit packets according to the adopted standard protocol.

When the non-volatile memory 1220 of the storage device 1200 includes a flash memory, such a flash memory may include a 2D NAND memory array or a 3D (or vertical) NAND (VNAND) memory array. As another example, the storage device 1200 may include different various types of non-volatile memories. For example, the storage device 1200 may include a MRAM (Magnetic RAM), a spin-transfer torque MRAM, a conductive bridging RAM (CBRAM), a FeRAM (Ferroelectric RAM), a PRAM (Phase RAM), a resistive memory (Resistive RAM), and various other types of memories.

According to an embodiment, the host controller 1110 and the host memory 1120 may be implemented as separate semiconductor chips. Further, in some embodiments, the host controller 1110 and the host memory 1120 may be integrated on the same semiconductor chip. As an example, the host controller 1110 may be any one of a plurality of modules provided in the application processor, and the application processor may be implemented as a system on chip (SoC). Further, the host memory 1120 may be an embedded memory provided inside the application processor, or a non-volatile memory or a memory module disposed outside the application processor.

The host controller 1110 may manage an operation of storing the data (for example, write data) of a buffer region of the host memory 1120 in the non-volatile memory 1220 or an operation of storing the data (for example, read data) of the non-volatile memory 1220 in the buffer region.

The storage controller 1210 may include a host interface 1211, a memory interface 1212, and a CPU (central processing unit) 1213. Also, the storage controller 1210 may further include a flash translation layer (FTL) 1214, a packet manager 1215, a buffer memory 1216, an ECC (error correction code) 1217 engine, and an AES (advanced encryption standard) 1218 engine. The storage controller 1210 may further include a working memory (not shown) into which the flash translation layer (FTL) 1214 is loaded, and when the CPU 1213 executes the flash translation layer 1214, the data write and read operations of the non-volatile memory 1220 may be controlled.

As described in FIGS. 1 to 12, for signal integrity, the host interface 1211 of the storage device 1200 measures the eye margin of the signal (S1 of FIG. 1) received at the receiver and compares it with the threshold eye margin to determine whether link re-equalization is required depending on the comparison result. When it is determined that link re-equalization is required, the host interface 1211 transmits the equalizing information to the host, and the host performs the link re-equalization on the basis of the equalizing information.

The host interface 1211 may transmit and receive packets to and from the host 1100. The packets transmitted from the host 100 to the host interface 1211 may include a command, data to be written in the non-volatile memory 1220, or the like. The packets transmitted from the host interface 1211 to the host 1100 may include a response to the command, data that is read from the non-volatile memory 1220 or the like. The memory interface 1212 may transmit the data to be written in the non-volatile memory 1220 to the non-volatile memory 1220 or receive the data that is read from the non-volatile memory 1220. Such a memory interface 1212 may be implemented to comply with standard protocols such as Toggle or ONFI (Open NAND Flash Interface).

The flash translation layer 1214 may perform various functions such as address mapping, wear-leveling, and garbage collection. The address mapping operation is an operation of changing a logical address received from the host 1100 into a physical address which is used for actually storing the data in the non-volatile memory 1220. The wear-leveling is a technique for ensuring that blocks in the non-volatile memory 1220 are used uniformly to prevent an excessive degradation of a particular block, and may be implemented, for example, through a firmware technique for balancing the erasure counts of the physical blocks. The garbage collection is a technique for ensuring an available capacity in the non-volatile memory 1220 through a method of copying the valid data of the block to a new block and then erasing the existing block.

The packet manager 1215 may generate a packet according to the protocol of the interface discussed with the host 1100, or may parse various types of information from the packet received from the host 1100. Further, the buffer memory 1216 may temporarily store the data to be written in the non-volatile memory 1220 or the data to be read from the non-volatile memory 1220. The buffer memory 1216 may be configured to be provided inside the storage controller 1210, but may be placed outside the storage controller 1210.

An ECC engine 1217 may perform error detection and correction functions on the read data that is read from the non-volatile memory 1220. More specifically, the ECC engine 1217 may generate parity bits for the write data to be written on the non-volatile memory 1220, and the parity bits thus generated may be stored in the non-volatile memory 1220 together with the write data. When reading the data from the non-volatile memory 1220, the ECC engine 1217 may correct an error of the read data, using the parity bits that are read from the non-volatile memory 1220, together with the read data, and may output the read data with a corrected error.

An AES engine 1218 may perform at least one of an encryption operation and a decryption operation on the data which is input to the storage controller 1210, using a symmetric-key algorithm.

Figure 14:
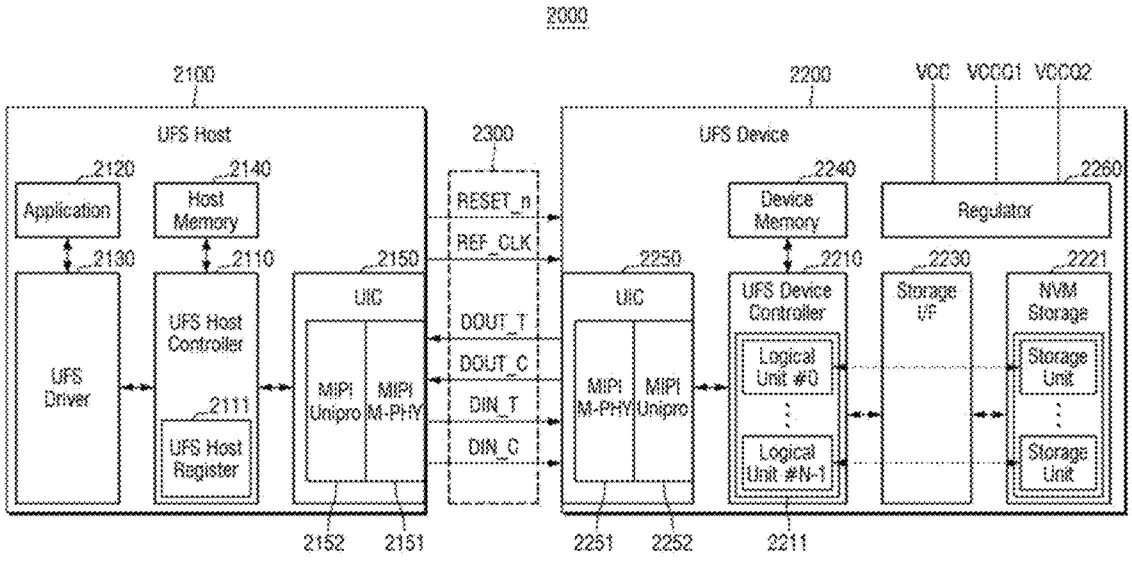
FIG. 14 is a diagram showing a universal flash storage (UFS) system, according to an embodiment.

FIG. 14 is a diagram showing a UFS system 2000 according to one embodiment of the invention. The UFS system 2000 is a system that complies with a UFS standard announced by JEDEC (Joint Electron Device Engineering Council), and may include a UFS host 2100, a UFS device 2200 and a UFS interface 2300. The above description of the host-storage system 1000 of FIG. 13 is also applicable to the UFS system 2000 of FIG. 5 within the range that does not contradict the following description of FIG. 14.

Referring to FIG. 14, the UFS host 2100 and the UFS device 2200 may be interconnected through the UFS interface 2300. If the host controller 1100 of FIG. 13 is an application processor, the UFS host 2100 may be implemented as a part of the corresponding application processor. The UFS host controller 2110 and the host memory 2140 may correspond to each of the host controller 1110 and the host memory 1120 of the host 1100 of FIG. 13. The UFS device 2200 may correspond to the storage device 200 of FIG. 13, and the UFS device controller 2210 and the non-volatile memory 2220 may correspond to each of the storage controller 1210 and the non-volatile memory 1220 of FIG. 13.

The UFS Host 2100 may include a UFS host controller 2110, an application 2120, a UFS driver 2130, a host memory 2140, and a UIC (UFS interconnect) layer 2150. The UFS device 2200 may include a UFS device controller 2210, a non-volatile memory 2220, a storage interface 2230, a device memory 2240, a UIC layer 2250 and a regulator 2260. The non-volatile memory 2220 may be made up of a plurality of memory units 2221, and such memory units 2221 may include a V-NAND flash memory of a 2D or 3D structure, but may also include other types of non-volatile memories such as a PRAM and/or a RRAM. The UFS device controller 2210 and the non-volatile memory 2220 may be connected to each other through the storage interface 2230. The storage interface 2230 may be implemented to comply with standard conventions such as Toggle or ONFI.

The application 2120 may refer to a program that desires to communicate with the UFS device 2200 to utilize the functionality of the UFS device 2200. The application 2120 may transmit an input/output request (IOR) to the UFS driver 2130 for input/output to/from the UFS device 2200. The input/output request (IOR) may mean, but is not necessarily limited to, a data read request, a write request, and/or a discard request.

The UFS driver 2130 may manage the UFS host controller 2110 through a UFS-HCI (host controller interface). The UFS driver 2130 may convert input and output requests generated by the application 2120 into UFS commands defined by the UFS standard, and transfer the converted UFS commands to the UFS host controller 2110. A single input and output request may be converted into a plurality of UFS commands. The UFS commands may be basically commands defined by the SCSI standard, but they may also be commands specific to the UFS standard.

The UFS host controller 2110 may transmit the UFS commands converted by the UFS driver 2130 to the UIC layer 2250 of the UFS device 2200 through the UIC layer 2150 and the UFS interface 2300. In this process, the UFS host register 2111 of the UFS host controller 2110 may serve as a command queue (CQ).

The UIC layer 2150 on the UFS host 2100 side may include a MIPI M-PHY 2151 and a MIPI UniPro 2152, and the UIC layer 2250 on the UFS device 2200 side may also include a MIPI M-PHY 2251 and a MIPI UniPro 2252. The UIC layer 2250 may perform the link re-equalization as described in FIGS. 1 to 12.

The UFS interface 2300 may include a line that transmits the reference clock REF_CLK, a line that transmits hardware reset signal RESET_n for the UFS device 2200, a pair of lines that transmit differential input signal pair DIN_t and DIN_c, and a pair of lines that transmit differential output signal pair DOUT_t and DOUT_c.

The UFS interface 2300 may support multiple lanes, and each lane may be implemented as a differential line pair. For example, the UFS interface 2300 may include one or more receive lanes and one or more transmit lanes. In FIG. 15, a pair of lines for transmitting the differential input signal pair DIN_T and DIN_C may constitute a receive lane, and a pair of lines for transmitting the differential output signal pair DOUT_T and DOUT_C may constitute a transmit lane, respectively. Although FIG. 15 shows one transmit lane and one receive lane, the number of transmit lanes and receive lanes may be changed.

The receive lane and the transmit lane may transmit data in a serial communication type, and a full-duplex type communication between the UFS host 2100 and the UFS device 2200 is enabled by the structure in which the receive lane and the transmit lane are separated.

The UFS device controller 2210 of the UFS device 2200 may generally control the operation of the UFS device 2200. The UFS device controller 2210 may manage the non-volatile memory 2220 through a LU (logical unit) 2211, which is a logical data storage unit.

When the command from the UFS host 2100 is input to the UFS device 2200 through the UIC layer 2250, the UFS device controller 2210 performs an operation according to the input command, and may transmit a completion response to UFS host 2100 when the operation is completed.

The UFS device controller 2210 may transmit the user data temporarily stored in the device memory 2240 to the UFS host 2100. Additionally, the UFS device controller 2210 may further include an AES (advanced encryption standard) engine (not shown). The AES engine may perform at least one of the encryption operation and the decryption operations on data to be input to the UFS device controller 2210, using a symmetric-key algorithm.

The UFS host 2100 may store commands to be transmitted to the UFS device 2200 sequentially in the UFS host register 2111, which may function as a command queue, and transmit the commands to the UFS device 2200 in the above sequence.

Each of the plurality of memory units 2221 may include a memory cell array (not shown) and a control circuit (not shown) that controls the operation of the memory cell array. The memory cell array may include a two-dimensional memory cell array or a three-dimensional memory cell array. The memory cell array includes a plurality of memory cells, and although each memory cell may be a cell that stores 1-bit information (signal level cell, SLC), each memory cell may be a cell that stores information of two or more bits, such as a MLC (multi level cell), a TLC (triple level cell), and a QLC (quadruple level cell). A three-dimensional memory cell array may include vertical NAND strings that are vertically oriented such that at least one memory cell is located above another memory cell.

VCC, VCCQ, VCCQ2 and the like may be input to the UFS device 2200 as power supply voltage. The VCC is a main power supply voltage for the UFS device 2200, and may have a value of 2.4 to 3.6V. The VCCQ is a power supply voltage for supplying low range of voltage, primarily for the UFS device controller 2210, and may have values from 1.14 to 1.26V. The VCCQ2 is a power supply voltage for supplying a voltage in the range lower than VCC but higher than VCCQ, mainly for input/output interfaces such as MIPI M-PHY 2251, and may have a value of 1.7 to 1.95V. The power supply voltage may be supplied for each component of the UFS device 2200 via the regulator 2260. The regulator 2260 may be implemented as a set of unit regulators each connected to a different one of the power supply voltages mentioned above.

Although some embodiments are described above with reference to the accompanying drawings, the disclosure is not limited to the above embodiments, and the described embodiments may be modified in various forms. Those skilled in the art will appreciate that the present disclosure may be embodied in other specific forms without changing the technical spirit of the present disclosure. Accordingly, the above-described embodiments should be understood in all respects as illustrative and not restrictive.

What is claimed is:

1. A method for operating an integrated circuit, the method comprising:

completing a first link equalization operation with an external integrated circuit;

receiving a first signal transmitted by an external transmitter included in the external integrated circuit during an operation at an internal receiver included in the integrated circuit;

measuring an eye margin of the first signal at the internal receiver;

comparing the measured eye margin with a threshold eye margin to obtain and store a comparison result;

transmitting the comparison result as a second signal to an external receiver included in the external integrated circuit using an internal transmitter included in the integrated circuit; and performing a second link equalization operation between the external transmitter and the internal receiver based on the second signal, wherein the second signal corresponds to an asynchronous event request (AER).

2. The method of claim 1, wherein the threshold eye margin comprises a range determined based on a last eye margin measured before a link re-equalization operation between the external integrated circuit and the integrated circuit is performed.

3. The method of claim 2, wherein the comparison result is stored each time the eye margin of the first signal is measured.

4. The method of claim 2, wherein the threshold eye margin comprises an upper value, a lower value, a left value, a right value, and an area based on a center position of an initial eye margin.

5. The method of claim 4, wherein the comparison result is stored based on a shift value of at least one of the upper value, the lower value, the left value, the right value, and the area of the measured eye margin exceeding the threshold eye margin.

6. The method of claim 4, wherein the comparison result comprises a predetermined weighted value for each type in each shift value for the upper value, the lower value, the left value, the right value, the area, and the center position of the measured eye margin.

7. The method of claim 1, wherein the second signal indicates a presence or an absence of a deformation of the measured eye margin based on the comparison result.

8. The method of claim 7, wherein the second signal comprises the measured eye margin as a registry value according to vendor information.

9. The method of claim 1, wherein the transmitting of the comparison result to the external integrated circuit comprises:

receiving, from the external integrated circuit, a Get Log Page command corresponding to the AER; and transmitting log data corresponding to the Get Log Page command to the external integrated circuit, wherein the log data comprises equalizing information.

10. The method of claim 9, wherein the equalizing information comprises a measured value of the eye margin and a level value of a critical grade.

11. The method of claim 1, wherein the integrated circuit is configured to:

receive the first signal from the external integrated circuit after the second link equalization operation is completed, transmit the second signal to the external integrated circuit, and perform a third link equalization operation with the external integrated circuit based on link re-equalization being requested again between the external transmitter and the internal receiver according to the second signal.

12. An integrated circuit comprising:

a first receiver configured to receive a first signal from an external integrated circuit after an initial link equalization is completed;

a reception equalizer configured to compensate for signal distortion of the first signal to generate a second signal;

an eye margin check module configured to:

measure an eye margin of the second signal, compare the measured eye margin with a threshold eye margin to obtain a comparison result, and store the comparison result; and a first transmitter configured to:

transmit the comparison result to the external integrated circuit as an asynchronous event request (AER), and wherein the integrated circuit receives a register read command corresponding to the AER from a second transmitter of the external integrated circuit, transmits the stored comparison result to a second receiver of the external integrated circuit and performs a link re-equalization operation with the external integrated circuit.

13. The integrated circuit of claim 12, wherein the eye margin check module comprises:

a measurement module configured to measure the eye margin of the second signal;

an information module configured to store the measured eye margin as log information together with an operating time of the first signal; and a shift measurement module configured to compare the measured eye margin with the threshold eye margin to calculate the comparison result.

14. The integrated circuit of claim 13, wherein the measurement module is further configured to measure the eye margin of the second signal based on a preset time or a preset count being exceeded.

15. The integrated circuit of claim 13, wherein the information module is further configured to store a log table obtained by mapping a time margin and a voltage margin of the measured eye margin to run-time information of the first signal.

16. The integrated circuit of claim 13, wherein the shift measurement module is further configured to, based on the measured value of the measured eye margin, calculate an area value and a critical grade based on the area value.

17. The integrated circuit of claim 16, wherein the integrated circuit is further configured to:

compare the calculated critical grade with a threshold level to determine a deformation determination flag corresponding to the measured eye margin, and store the deformation determination flag in the information module together with the measured value.

18. A storage device comprising at least one processor configured to:

perform an initial link equalization with a host;

measure an eye margin of a signal received from the host during an operation with the host;

store the measured eye margin and a comparison result determined based on a comparison between the measured eye margin and a threshold eye margin;

transmit the comparison result to the host based on an asynchronous event request (AER); and perform a link re-equalization with the host based on the comparison result.

19. The storage device of claim 18, wherein the eye margin of the signal received from the host is periodically measured and stored.

20. The storage device of claim 18, wherein to transmit the stored comparison result, the at least one processor is further configured to:

receive, from the host, a Get Log Page command corresponding to the AER, and generate log data corresponding to the Get Log Page command, the log data comprising equalizing information, and transmit the log data to the host.

21. The storage device of claim 20, wherein the equalizing information comprises a measured value of the measured eye margin and a deformation determination flag calculated based on the measured value.

* * * * *